G. H. CHINNOCK.
Oil-Can Tops.

No. 156,877.

Patented Nov. 17, 1874.

Witnesses
W. M. Edwards.
James Lindsay.

Inventor
George H. Chinnock
per James A. Whitney
Attorney

UNITED STATES PATENT OFFICE.

GEORGE H. CHINNOCK, OF BROOKLYN, ASSIGNOR TO JABEZ A. BOSTWICK, OF NEW YORK, N. Y.

IMPROVEMENT IN OIL-CAN TOPS.

Specification forming part of Letters Patent No. 156,877, dated November 17, 1874; application filed September 25, 1874.

*To all whom it may concern:*

Be it known that I, GEORGE H. CHINNOCK, of Brooklyn, in the county of Kings and State of New York, have invented certain Improvements in Faucets for Cans, of which the following is a specification:

This invention is designed to provide a faucet for oil and other cans, which, when closed, will effectually seal the can, and when open permit the uninterrupted flow of the contents of the same through the faucet without liability of leakage or spilling over or upon the can, and which, furthermore, may be operated by the application of a comparatively moderate degree of force, and without the excessive abrasion and wear of the valve and valve-seat, forming part of the faucet, hitherto commonly experienced in the use of other devices for like purposes.

The invention consists in certain novel combinations of parts, whereby the desired object is secured.

Figure 3:
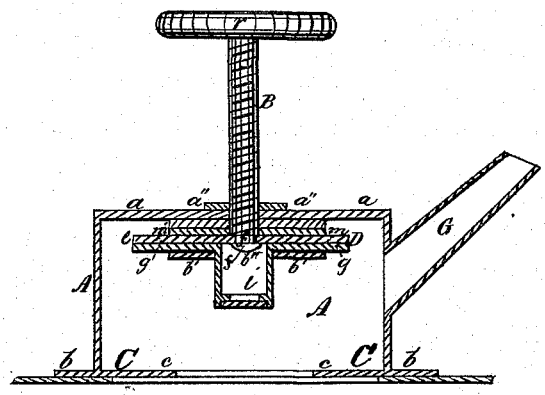
Figure 2:
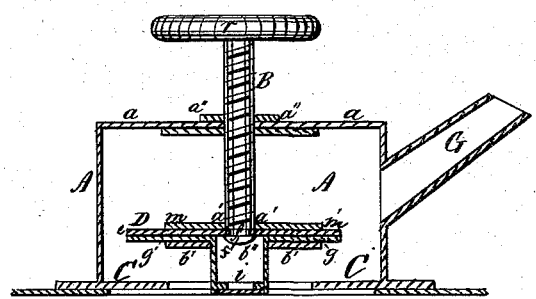
Figure 1:
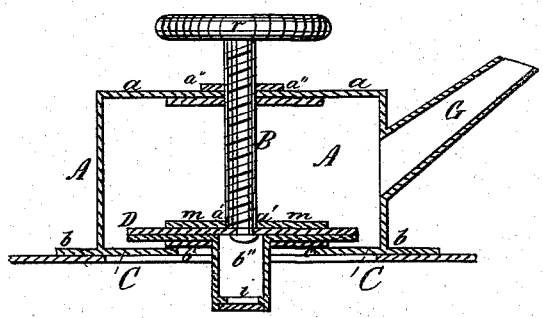

Figure 1 is a vertical transverse sectional view, on an enlarged scale, of a faucet for cans, made according to my invention, showing the position of the parts when the faucet is closed; and Figs. 2 and 3 are similar views, representing the faucet as opened, to permit the outflow of the contents of the can.

A is a cylindrical shell formed of sheet metal, and constructed with a fixed or rigid top or upper end, $a$, either soldered thereto or formed in one piece therewith. In the center of this top $a$ is provided a bearing for the vertical screw B, working therethrough, and provided at the top with a head or thumb-piece, $r$. This bearing may consist of an internally-threaded disk or nut, $a''$, soldered to the top $a$, preferably upon its upper or outer side. At its lower edge the shell is soldered to an annular sheet-metal plate, C, the outer portion $b$ of which, projecting beyond the circumference of the shell, constitutes a flange, which, in the attachment of the faucet to the can, is soldered to the edges of a suitable orifice provided in the latter. The inner portion of the plate C forms the seat $c$ of the valve D, which is loosely attached to the lower end of the screw B. The valve D is of considerably less diameter than the shell, so that when it is lifted a space will be left between its periphery and the sides of the surrounding shell. The valve is preferably composed of a disk, $e$, through a hole in the center of which is passed the extremity $b''$ of the screw B, reduced at this part to provide a shoulder, $a'$, above the plate, to enable the screw to force the valve downward. The extremity of the screw is headed or upset upon the under side of the plate to provide a similar shoulder, to enable the screw to lift the valve. The end of the screw must be sufficiently loose at the joint just described, and specifically indicated by the letter $f$, to permit the axial movement of the valve. Upon the under side of the disk $e$ is affixed another disk, $g$, at the center of which is a downwardly-projecting cup, $i$, formed in one therewith, and covering the protuberance formed by the headed or upset lower end of the screw. Upon the lower side of the valve is further provided a packing, $b'$, of leather or other suitable material. Extending laterally from the shell, preferably in the direction of one corner of the can to which the faucet is affixed, is a tubular spout, G, of cylindrical or slightly tapering form, and arranged at an angle from the horizontal of, say, forty-five degrees.

In order to shut the faucet the screw is turned in such direction as to move the valve downward, until it is brought snugly upon its seat. In the absence of any resistance to its rotating motion the valve may turn with the screw, until, coming upon the valve-seat the frictional contact of the latter overcomes that exerted at the bearing $f$, whereupon the valve ceases to rotate, and is pressed vertically downward against the seat without any of the grinding or abrasive action which would be exerted upon both valve and seat if the valve were caused to rotate until brought down with the closeness requisite to prevent the passage of liquids. At the same time this result is secured without the additional expense, complexity of construction, and liability of derangement that would exist if guides were used to wholly prevent the rotation of the valve during its vertical movement, such guides being, furthermore, difficult of application when the valve, as compared with the shell, has the diminished diameter hereinbefore set forth.

In order to reopen the faucet, it is ordinarily only necessary to slightly lift the valve by turning the screw in a direction opposite that heretofore particularized, so that the can being tilted to the proper extent, its liquid contents, flowing through the space afforded between the periphery of the valve and the sides of the shell, will pass to and through the outlet afforded by the spout. The shell being entirely closed, except at the said outlet, any percolation or leakage of the liquid through or from the same upon the top or upper surface of the can is effectually provided against. As a measure of precaution, however, in case the screw should fit loosely in its bearing or nut in the closed top of the shell, a packing, m, is fitted upon the upper side of the valve concentric with the screw, and when leakage around the screw is anticipated, the valve, in opening the faucet, should be lifted until the packing m is snugly compressed against that portion of the top of the shell immediately about the bearing of the screw.

It should also be borne in mind that the packing b' being concentric with the cup i, and with its inner edge pressed snugly against the same, the frictional contact of the said edge with the cup is sufficient to retain the packing in its place without the use of rivets or analogous devices.

What I claim as my invention is—

1. The combination, with the valve D, operated by the screw B, working through the fixed top a of the shell A, of the packing m upon the upper side of the valve, whereby, when the valve is raised to its limit, the joint about the screw is securely sealed, substantially as set forth.

2. The swivel-joint f, connecting the valve D, and screw B working within the shell A, and the outlet of the same, substantially as set forth.

3. The valve D, composed of the disk or plate through which is passed the shouldered and upset lower end of the screw B, and the disk g formed with the cup i, covering the upset extremity of the screw, substantially as set forth.

GEO. H. CHINNOCK.

Witnesses:
 JAMES A. WHITNEY,
 W. M. EDWARD.